3,013,362
MANUFACTURE OF SEMICRYSTALLINE
CERAMIC BODIES

Faye A. Calkins and Joseph W. Morrissey, Corning, N.Y., assignors to Corning Glass Works, Corning, N.Y., a corporation of New York
No Drawing. Filed Mar. 7, 1960, Ser. No. 12,976
6 Claims. (Cl. 49—77)

This invention relates to the production of semicrystalline ceramic bodies by the controlled crystallization of glass bodies by heat treatment described in Patent No. 2,920,971, issued January 12, 1960, to Stanley D. Stookey. The surfaces of articles made in accordance with the methods disclosed in that patent have been found to be subject to attack by alkaline solutions, such as detergent solutions. Whereas the susceptibility to such attack is undesirable whenever and wherever encountered, it is particularly undesirable in semicrystalline bodies made in accordance with the methods disclosed in the pending application of Stanley D. Stookey, Serial No. 718,398, filed March 3, 1958, for producing semicrystalline bodies comprising 55–75% $SiO_2$, 3–7% $TiO_2$, 2–15% $Li_2O$, and 12–36% $Al_2O_3$, the weight ratio $Li_2O/Al_2O_3$ being 0.1 to 0.6, the total $SiO_2$, $TiO_2$, $Li_2O$, and $Al_2O_3$ being at least 95%. It is more particularly undesirable in the manufacture of semicrystalline ceramic culinary ware having a relatively high modulus of rupture (MOR) and a low thermal expansion coefficient by heat treatment of glass bodies consisting essentially of approximately by weight, 70% $SiO_2$, 2.5% $Li_2O$, 18% $Al_2O_3$, 4.5% $TiO_2$, 3% MgO, 1% ZnO, and not more than about 1% of minor constituents including impurities by heating it to about 800° C., holding it at such temperature for about 1 hour, finally heating it to 1080–1175° C., holding it in such temperature range for a time ranging from about 4 hours at 1080–1120° C. to about 2 hours at 1120–1175° C. and thereafter cooling it. For least distortion, the body preferably is held for about 2 hours at about 1080° C. and for about 2 hours at about 1120° C. The resulting semicrystalline body has a MOR of at least 13,000 p.s.i., a thermal expansion coefficient not exceeding about $15 \times 10^{-7}/°$ C. between 0° and 300° C. and no substantial deformation. Higher MOR and lower expansion coefficients can be obtained by carrying out the final heating for about 2 hours at 1120–1175° C. while supporting the ware against distortion.

It has been found that such semicrystalline culinary ware, after long use and repeated cleaning with alkaline detergents, sometimes tends to absorb unsightly strains which are very difficult to remove by ordinary cleaning and scouring procedures. The manner in which such stains are produced is not clearly understood but they are believed to be caused by a penetration of the staining material into the surface of the semicrystalline body after such surface has been rendered minutely porous by repeated contact with alkaline detergents. Such explanation seems to be confirmed by the following accelerated test.

A specimen of the semicrystalline ware to be tested is immersed in a 0.3% aqueous solution of a commercial detergent composed of approximately equal parts of $Na_2CO_3$, $Na_5P_2O_{10}$, $Na_4P_2O_7$, and $Na_2SiO_3$ having a pH of about 11, the temperature of the solution being maintained closely at 95° C. After 24 hours the specimen is removed and, without being allowed to dry, is immediately washed and scrubbed with a cloth in a fresh 0.3% solution of the detergent to remove any residue or sediment and is then thoroughly rinsed and dried.

The effect of such treatment is then evaluated as follows: The dried specimen is coated with a solution of a red penetrating dye and the excess dye is removed by wiping the specimen with a dry cloth. If the surface wipes clean and white, it is considered to be stain-resistant for normal use. If a pink stain remains, the stained area is scrubbed with a powdered household cleanser for 30 seconds. A surface in which a substantial pink stain remains after such scouring is considered to be insufficiently stain-resistant for normal use. In comparison, a specimen of such semicrystalline ware, which has not been treated with the hot detergent solution, remains clean and white and does not retain a stain on or within its surface when coated with said red dye and then wiped.

The primary object of this invention is to increase the resistance to attack by alkaline solutions of semicrystalline bodies resulting from the heat treatment of glass bodies.

Another object is to provide a method of improving the surface durability of semicrystalline culinary ware during its heat treatment so that its surface will not be attacked by subsequent cleaning with detergent solutions and will thereafter be stain resistant.

Another object is to provide stain-resistant culinary ware resulting from such method.

To these and other ends the invention comprises carrying out the described heat treatment in a reducing atmosphere until the temperature has reached 900–1000° C. and thereafter substituting therefor an oxidizing atmosphere and maintaining it during the further heat treatment and the cooling to below about 1000° C.

The reducing atmosphere can be produced in any convenient manner, such as by passing into the heating kiln a non-explosive mixture of nitrogen and hydrogen, which mode is particularly suitable for muffle kilns and electrically heated kilns. In commercial practice it has been found most advantageous to carry out the heat treatment in a gas fired kiln and to provide either a reducing or an oxidizing atmosphere in the kiln by diminishing or increasing the primary air supply of the gas burners by suitable adjustment of their air intake ports. During such provision of a reducing atmosphere the gas will burn with a yellow flame at the sting-out and some partially burned gas will be present within the kiln.

For the purpose of controlling the reducing atmosphere, a device known as an analyzer, which electrically measures and continuously records the percentage of excess combustibles in the kiln atmosphere, was used to follow the conditions within the kiln. It is not possible to exactly maintain a desired excess of combustibles without some variation, and an average of 4.5% excess combustibles has been found to vary between 1% and 10%.

While the present invention is of general applicability in increasing the resistance to detergent attack of semicrystalline ceramics produced from glass bodies by heat treatment thereof, the invention will be described hereinafter, for the sake of brevity, but not by way of limitation, with respect to semicrystalline culinary ware and to the specific compositions and heat treatments heretofore found especially applicable thereto. Accordingly, whereas the following discussion is concerned with producing stain-resistant culinary ware from glass bodies having a composition consisting essentially of approximately, by weight, 70% $SiO_2$, 2.5% $Li_2O$, 18% $Al_2O_3$, 4.5% $TiO_2$, 3% MgO, 1% ZnO, and about 1% of minor constitutents including impurities, it will be appreciated that the benefits of the invention may be realized by carrying out in a reducing atmosphere the heat treating steps which are essential for converting other glass bodies to the semicrystalline state in accordance with the teachings of the above mentioned patents.

The parent glass of the above composition preferably is melted in conventional manner at about 1600° C. in a continuous tank furnace. In order to maintain normal oxidizing conditions in the tank during melting, small amounts of $NaNO_3$ and $As_2O_5$ are included in the batch as oxidizing agents, the $As_2O_5$ also functioning as a fining agent. Other conventional oxidizing and fining agents can be substituted, if desired. The residual $Na_2O$ and $As_2O_3$ remaining in the glass have no substantial effect on the properties of the semicrystalline product. A very small amount of $K_2O$ usually occurs in some of the batch materials, particularly petalite, and is present in the final product as a harmless impurity.

When the melting is carried out in contact with zircon-containing refractories, a small amount of $ZrO_2$ appears in the final composition. This is actually beneficial, since it is well known that small amounts of $ZrO_2$ tend to improve the chemical stability of glasses generally. For that reason the inclusion of a few tenths of a percent of $ZrO_2$ in batches not to be melted in zircon refractories is advantageous. The finished glass is formed into bodies of desired shape and size by pressing, blowing, spinning, rolling, drawing, or the like.

In carrying out the heat treatment of the glass body and in order to insure against shattering or deforming it by bringing it to too high a temperature before sufficient crystallization has occurred to support it in its original form, it has been found desirable to limit the rate of temperature increase during heat treatment to about 5° C. per minute, though much higher rates can of course be tolerated if the bodies being treated have sufficiently thin and uniform cross section so that substantial thermal gradients will not occur, and if the bodies are adequately supported.

The use of a preliminary holding temperature or range is essential for the proper initiation of crystallization. It is believed that at such temperature submicroscopic crystallites form throughout the glass and gradually increase in size with time and temperature to form an interlocked or randomly oriented crystal structure or network of high melting point which ultimately will support the body and minimize its deformation as the temperature is further increased.

In order to convert glass bodies of the above-defined composition to semicrystalline bodies of high MOR and low expansion coefficient without substantial deformation, the best preliminary holding temperature has been found to be about 800° C. The most effective holding time at such temperature has been found to be about 1 hour. Too great a variation from such holding time and/or temperature tends to lower the MOR of the final product and cause deformation.

The conversion of the glass body to the desired semicrystalline state is far from complete at this stage and a final heating at a higher temperature, 1080–1175° C., is required. During such heating the best results are obtained by holding the temperautre for about 2 hours at about 1080° C. followed by about 2 hours at about 1120° C. It is difficult to hold, elevate and again hold with exactness the temperature of ware stacked on cars passing through a commercial type heating kiln but failure to raise the temperature of the ware high enough or to hold it at the stated temperature tends to lower its MOR. As pointed out above, a higher MOR and lower expansion coefficient can be obtained by finally heating the ware for about 2 hours at 1120–1175° C.

The effectiveness of the new method in producing semicrystalline culinary ware, which is stain-resistant, is apparent from the following considerations. Several series of glass skillets, composed of the above-defined glass composition and known to lack resistance to staining after being converted to the semicrystalline state and subjected to said accelerated test, were heat treated according to the above-described preferred schedule of temperatures and holding times in a gas fired kiln having adjustable burners. The atmosphere of the kiln was varied by suitable adjustment of the burners to make it reducing or oxidizing as desired. The resulting semicrystalline skillets were subjected to the above-described accelerated test and evaluation with the following results:

When an oxidizing atmosphere was maintained throughout the heat treatment and cooling, the skillets were not stain-resistant but retained a deep pink stain after being scoured with a household cleanser.

When a reducing atmosphere amounting to an average of about 4.5% excess combustibles was maintained through the 1 hour holding at the preliminary holding temperature followed by an oxidizing atmosphere through the remainder of the heating and cooling schedule, some of the skillets were white and stain-resistant but in a few instances a small area of faint pink stain remained and such skillets were adjudged to be stain-reststant for at least 1 year of normal use.

When the atmosphere of the kiln was reducing as above only up to a temperature of 780° C. and thereafter was oxidizing, the result was only about 50% better than when the atmosphere was oxidizing throughout the entire heating and cooling schedule.

Complete stain-resistance, however, was obtained when the initial reducing atmosphere was converted to oxidizing at a temperature of about 980° C. and remained oxidizing through the further heating and until cooled to about 1000° C.

When an oxidizing atmosphere was used throughout the heating schedule and was then converted to the aforesaid reducing atmosphere only at the beginning of the cooling period (1120° C.) and so maintained down to 700° C., the stain-resistance seemed very good but could not be accurately determined on account of an objectionable darkening of the surface due to a reduction at the higher temperatures of some of the constituents of the composition. Maintenance of a reducing atmosphere through the high temperature range and during cooling to below about 1000° C., therefore, is not desirable.

What is claimed is:

1. In the method of converting a glass body to a semicrystalline body by heat treatment, said semicrystalline body being subject to attack by alkaline solutions, the method of increasing the resistance to such attack which comprises carrying out the heat treatment in a reducing atmosphere, equivalent to 1–10% of excess combustibles therein, until the temperature has reached 900–1000° C., and thereafter substituting therefor an oxidizing atmosphere and maintaining it during the final heating and the cooling to below about 1000° C.

2. In the method of converting a glass body, comprising 55–75% $SiO_2$, 3–7% $TiO_2$, 2–15% $Li_2O$, and 12–36% $Al_2O_3$, the weight ratio $Li_2O/Al_2O_3$ being 0.1 to 0.6, the total $SiO_2$, $TiO_2$, $Li_2O$ and $Al_2O_3$ being at least 95%, to a semicrystalline body, said semicrystalline body being subject to attack by alkaline solutions, the method of increasing the resistance to such attack which comprises carrying out the heat treatment in a reducing atmosphere, equivalent to 1–10% of excess combustibles therein, until the temperature has reached 900–1000° C., and thereafter substituting therefor an oxidizing atmosphere and maintaining it during the final heating and the cooling to below about 1000° C.

3. In the method of making semicrystalline culinary ware by heat treating a glass body consisting essentially of approximately 70% $SiO_2$, 2.5% $Li_2O$, 18% $Al_2O_3$, 4.5% $TiO_2$, 3% $MgO$, 1% $ZnO$, and not more than about 1% of minor constituents including impurities by heating the glass body to about 800° C., holding it at such temperature for about 1 hour, finally heating it to 1080–1175° C., holding it in such temperaure range for a time ranging from about 4 hours at 1080–1120° C. to about 2 hours at 1120–1175° C., and thereafter cooling it, the step which comprises carrying out the heat treatment in a reducing atmosphere, equivalent to 1–10% of excess combustibles therein, until the temperature has reached 900–1000° C., and thereafter substituting therefor an oxidizing atmosphere and maintaining it during the final heating and the cooling to below about 1000° C.

4. The method defined in claim 1 in which the temperature of the body is held for about 2 hours at about 1080° C. and for about 2 hours at about 1120° C.

5. The method defined in claim 1 in which the oxidizing atmosphere is substituted for the reducing atmosphere when the temperature has reached about 980° C.

6. The method defined in claim 2 in which the oxidizing atmosphere is substituted for the reducing atmosphere when the temperature has reached about 980° C.

References Cited in the file of this patent

UNITED STATES PATENTS

| | | |
|---|---|---|
| 2,779,136 | Stookey | Jan. 29, 1957 |
| 2,792,287 | Moore | May 14, 1957 |
| 2,904,432 | Ross et al. | Sept. 15, 1959 |
| 2,911,749 | Stookey | Nov. 10, 1959 |